United States Patent
Zhu et al.

(10) Patent No.: US 11,852,582 B2
(45) Date of Patent: Dec. 26, 2023

(54) AUTOMATIC PHOTOCURRENT SPECTRUM MEASUREMENT SYSTEM BASED ON FOURIER INFRARED SPECTROMETER

(71) Applicant: East China Normal University, Shanghai (CN)

(72) Inventors: Liangqing Zhu, Shanghai (CN); Junli Wang, Shanghai (CN); Liyan Shang, Shanghai (CN); Le Wang, Shanghai (CN); Zhigao Hu, Shanghai (CN)

(73) Assignee: East China Normal University, Shanghai (CN)

( * ) Notice: Subject to any disclaimer, the term of this patent is extended or adjusted under 35 U.S.C. 154(b) by 0 days.

(21) Appl. No.: 17/879,665

(22) Filed: Aug. 2, 2022

(65) Prior Publication Data

US 2022/0381683 A1    Dec. 1, 2022

(30) Foreign Application Priority Data

Aug. 13, 2021   (CN) .......................... 202110929415.7

(51) Int. Cl.
  *G01N 21/35*   (2014.01)
  *G01N 21/3563*  (2014.01)
  *G01N 21/01*   (2006.01)

(52) U.S. Cl.
  CPC ......... *G01N 21/3563* (2013.01); *G01N 21/01* (2013.01); *G01N 2021/3595* (2013.01); *G01N 2201/023* (2013.01)

(58) Field of Classification Search
  CPC ............... G01N 21/3563; G01N 21/01; G01N 2021/3595
  See application file for complete search history.

(56) References Cited

U.S. PATENT DOCUMENTS

2003/0067312 A1* 4/2003 Pfaff ........................ G03H 1/02
                                                  324/762.02
2018/0247968 A1* 8/2018 Na ........................ H01L 29/161

FOREIGN PATENT DOCUMENTS

CN         108593110 A    9/2018
CN         110530793 A    12/2019

* cited by examiner

*Primary Examiner* — Hugh Maupin

(57) ABSTRACT

An automatic photocurrent spectrum measurement system based on a Fourier infrared spectrometer, including a light source component, an environment control component, a measuring module, and a control module. The system is configured to evaluate photoelectric performance semiconductor materials or devices under different temperatures, voltage biases or current biases.

8 Claims, 3 Drawing Sheets

AUTOMATIC PHOTOCURRENT SPECTRUM MEASUREMENT SYSTEM BASED ON FOURIER INFRARED SPECTROMETER

CROSS-REFERENCE TO RELATED APPLICATIONS

This application claims the benefit of priority from Chinese Patent Application No. 202110929415.7, filed on Aug. 13, 2021. The content of the aforementioned application, including any intervening amendments thereto, is incorporated herein by reference in its entirety.

TECHNICAL FIELD

This application relates to photoelectric performance measurement of semiconductor materials at different temperatures and different biases, and more particularly to an automatic photocurrent spectrum measurement system based on a Fourier infrared spectrometer.

BACKGROUND

Semiconductor materials, such as gallium arsenide (GaAs) and indium phosphate (InP), and other III-V compound semiconductors, have good optical response properties, and thus have been extensively used in photoelectric detectors, optical energy storage materials, and solar cells.

Under the exposure to light, electrons and holes will be generated in the conduction band and forbidden band of the semiconductor material, and these additional photo-generated carriers will change the electrical properties of the material. The optical absorption is affected by wavelength, temperature, and bias of the light. By measuring the optimal wavelength range of light response of the material under different conditions, the material can be applied to various photoelectric devices and exhibits excellent performance.

Currently, the photoelectrical performances of materials are often characterized by photocurrent spectra measured at different wavelengths using a grating spectrometer. However, with regard to the investigation of photoelectric properties of semiconductor materials, the grating spectrometer struggles with narrow measurement wavelength range (300 nm-2000 nm), low accuracy and poor test efficiency. In addition, the photoelectric properties are also associated with temperature and bias, so it is necessary to manually adjust the temperature control system and measuring instruments, resulting in greatly reduced test efficiency.

SUMMARY

The purpose of this application is to provide an automatic photocurrent spectrum measurement system based on Fourier infrared spectrometer to overcome the above shortcomings in the prior art, in which an environmental control module composed of a temperature control device and a vacuum device is employed to provide the desired test temperature for the system and sample, so as to enable the automatic measurement of photoelectric properties of materials under different conditions and automatic data analysis and processing. By measuring photoelectric properties of semiconductor materials or devices at different temperatures, voltages or current biases, the performance of materials or devices under different conditions can be accurately evaluated. The measurement system provided herein has simple structure, easy operation, wide wavelength range, high precision, excellent efficiency, and strong applicability, and thus has a brilliant application prospect.

Technical solutions of this application are described as follows.

Provided is an automatic photocurrent spectrum measurement system based on a Fourier infrared spectrometer, comprising:
a light source component;
an environment control component;
a measurement module; and
a control module;
wherein the light source component comprises an infrared light source and the Fourier infrared spectrometer; the Fourier infrared spectrometer comprises an interferometer, a test chamber and a data conversion module;
the infrared light source is configured to provide 1-100 µm infrared band light; and the interferometer is configured to convert the infrared band light into interference light;
the environment control component comprises a temperature control device and a vacuum system; the temperature control device comprises a temperature control table and a cold head; the cold head is provided with an electrode with a wire leading to an outside; the temperature control device is configured to provide a sample test temperature; the vacuum system is configured to provide vacuum conditions for the test chamber and sample environment;
the measurement module is configured to apply bias voltage and bias current to the electrode; according to the measurement requirements, the measurement module is configured to transmit a collected signal to the control module or the Fourier infrared spectrometer; and the data conversion module is configured to perform Fourier transform on a photocurrent interference signal of the collected signal to generate a frequency domain signal, and transmit the frequency domain signal into the control module;
the control module is configured to send an test instruction to individual components and modules according to measurement requirements; the light source component is configured to control switching of the infrared light source and adjust scanning range and resolution of Fourier infrared spectrometer after receiving the test instruction; the measurement module is configured to change a range of the bias voltage or bias current, and scanning step, collect an electrical signal generated by sample response and transmit the electrical signal to the control module and the light source component after receiving the test instruction; the environment control component is configured to set the sample test temperature point and a vacuum environment in the test chamber; and the control module is also configured to display, analyze and process data transmitted by the measurement module and the Fourier infrared spectrometer.

In some embodiments, the infrared light source is a near-infrared tungsten filament lamp or iodine tungsten lamp, a mid-infrared silicon carbide rod, or a far-infrared high-pressure mercury lamp.

In some embodiments, a maximum resolution of the Fourier infrared spectrometer is 1 cm$^{-1}$.

In some embodiments, the measurement module is a digital source meter capable of applying a current of 10 nA-7 A.

In some embodiments, the cold head of the temperature control device is provided in the test chamber of the Fourier infrared spectrometer; the cold head and the test chamber are both in a vacuum environment; and a controllable temperature range of the temperature control device is 4K-320K.

In some embodiments, communication of the control module with the light source component, the measurement module and the environment control component is performed through a general-purpose interface bus (GPIB) IEEE 488.2 protocol.

In some embodiments, the cold head is further provided with a form.

In some embodiments, the control module comprises a first test unit, a second test unit, a data display unit, and a data analysis and processing unit;

the first test unit is configured to control connection of the control module with the measurement module, the light source component and the environment control component, and display connection status, device information and port information;

the second test unit comprises an electrical test unit and a photocurrent spectrum test unit, and is configured to set parameters and send commands to the measurement module, the light source component and the environment control component;

the data display unit is configured for real-time display of data acquisition and data transmitted by the data conversion module; and the data analysis and processing unit is configured to analyze, process and save collected data.

Compared to the prior art, this application has the following beneficial effects.

(1) Wide measurement range

The system provided herein covers the whole infrared band.

(2) High degree of automation

Appropriate test items and configuration parameters can be automatically selected to complete the test according to the measurement requirements.

(3) Automatic data analysis and processing

The collected data can be automatically analyzed and processed, and the photoelectric properties of materials or devices can be assessed according to the generated test reports.

(4) The system has high test precision, excellent efficiency, and strong applicability.

BRIEF DESCRIPTION OF THE DRAWINGS

The accompanying drawings used in the description of the embodiments of the disclosure will be briefly described below. It should be understood that presented in the drawings are merely some embodiments of the disclosure, which are not intended to limit the disclosure. Other drawings obtained by those skilled in the art based on the drawings provided herein without paying any creative effort should fall within the scope of the disclosure.

DETAILED DESCRIPTION OF EMBODIMENTS

The disclosure will be described in more detail below with reference to the embodiments and accompany draw-ings, but the following embodiments are merely illustrative and are not intended to limit the disclosure.

Figure 1:
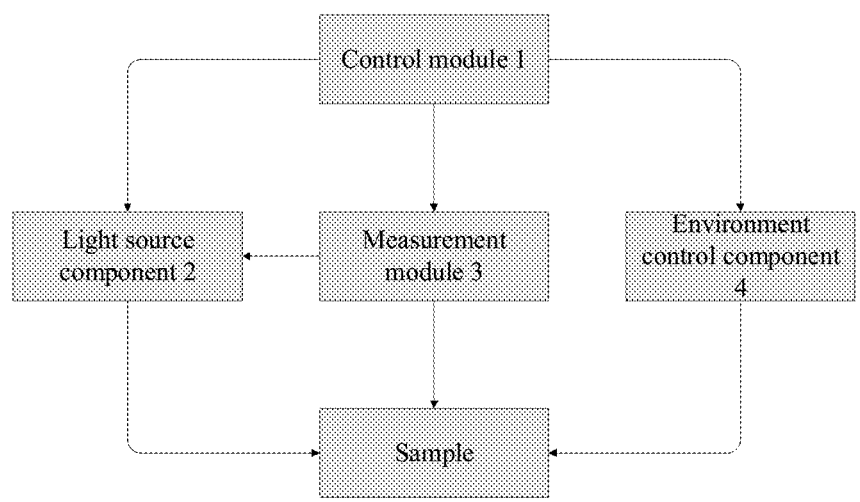
FIG. 1 is a block diagram of an automatic photocurrent spectrum measurement system according to an embodiment of the disclosure.

FIG. 1 is a block diagram of an automatic photocurrent spectrum measurement system provided herein. The system includes a control module 1, a light source component 2, a measurement module 3, and an environment control component 4.

The light source component 2 can be selected from a tungsten filament lamp or a tungsten iodine tungsten lamp (near-infrared), a silicon carbide rod (mid-infrared), and a high-pressure mercury lamp (far infrared) as required. The infrared light is converted into interference light by the FTIR spectrometer (with a maximum resolution of 1 $cm^{-1}$) to irradiate the test sample.

The measurement module 3 is configured to apply bias voltage or current (10 nA-7 A) to the electrode 413 and collect a photocurrent signal of the sample. The collected photocurrent signal is transmitted to the control module 1 through the data conversion module 223 in the light source component 2.

The environment control component 4 is configured to provide desired temperature and vacuum environment for measurement. The controllable temperature range of a temperature control device is 4K-320K.

Figure 2:
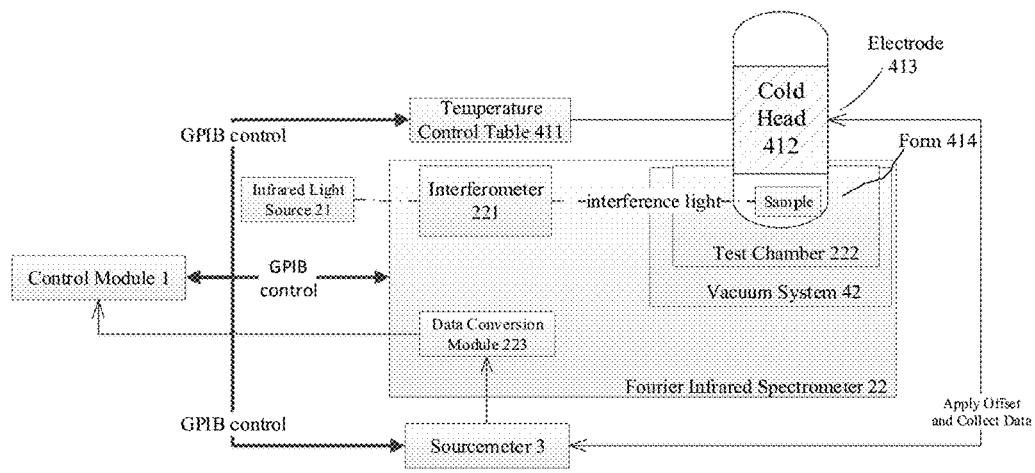
FIG. 2 is a structure diagram of the automatic photocurrent spectrum measurement system according to an embodiment of the disclosure.

FIG. 2 is a schematic diagram structurally showing the automatic photocurrent spectrum measurement system according to an embodiment of the present disclosure. The light source component 2 includes an infrared light source 21 and a Fourier infrared spectrometer 22. Different infrared light bands can be selected according to experimental requirements, and the incident light is converted by the interferometer 221 into interference light to irradiate the sample in the test chamber 222.

The measurement module 3 is a digital source meter, which is connected to an external electrode 413 of the cold head 412 through wires, and is configured to provide the required bias voltage or bias current for measurement, collect an electrical signal of the sample in the cold head 412, perform analog-to-digital conversion on the electrical signal, and transmit the converted photocurrent interference signal to the data conversion module 223 for Fourier transform to obtain a photocurrent frequency domain signal. Then the data conversion module 223 transmits the photocurrent frequency domain signal to the control module 1.

The control module 1 adopts a computer for display and control. The communication between the control module 1 and other components and modules is performed through GPIB IEEE 488.2 protocol. The control module 1 is configured to send a test instruction to control the infrared light source 21 and the Fourier infrared spectrometer 22 to change the scanning range and resolution, control the digital source meter 3 to produce the desired bias voltage or current, collect the voltage or current signal of the sample, and control the temperature control table 411 to provide different temperature points. Meanwhile, the control module 1 is also configured to display the status information and test information of individual components and modules, and analyze and process the data.

The system provided herein can be used to perform an electrical test or a photocurrent spectrum test, and the test process will be described in detail below with reference to a corresponding embodiment.

Embodiment 1

Figure 3:
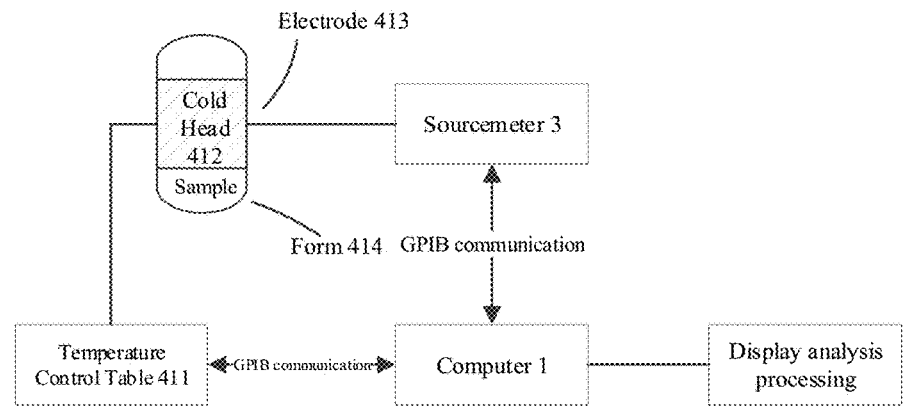
FIG. 3 schematically illustrates electrical measurement according to an embodiment of the disclosure.

Referring to FIG. 3, the electrical test is specifically performed as follows.

(1) The test sample is placed on a fix bracket 415 of the cold head 412, and a signal end of the measurement module 3 (i.e., the digital source meter) is connected to the external electrode 413 of the cold head 412.

(2) The radial form 414 below the cold head 412 is replaced with an opaque material to reduce the influence of light on the test sample.

(3) A vacuum pump is turned on to vacuumizing an inside of the cold head 412.

(4) A voltage scanning range and voltage scanning step of the source meter 3 and a temperature scanning range and scanning step of the temperature control table 411 are set in the interface program of the control module 1 (computer). After that, the system will monitor the temperature parameter of the temperature control table 411. When a preset temperature point is reached, the digital source meter 3 starts to output voltage, and collect a current signal of the sample for real-time display on the control module 1. After the data collection is completed, the temperature is adjusted to the next temperature point through the temperature control table 411, and the above process is repeated.

(1) According to the test sample, the data is fitted by linear fitting y=kx+b and diode volt-ampere characteristic theoretical model fitting $I=I_s(e^{U/U_T}-1)$. For doped semiconductor materials, the resistivity and temperature relationship can be expressed as proportional to $$\frac{1}{AT^{3/2} + \frac{BN_i}{T^{3/2}}},$$

where Ni is the carrier concentration. For photodiodes, the current intensity can be expressed as $I_d=I_s(e^{qv/nkT}-1)$, where $I_d$ is the current flowing through the diode, and $I_s$ represents the reverse saturation current.

(2) After the tests at all temperature points have been completed, the system generates a resistance-temperature curve of the material and a variable temperature voltammetry characteristic curve of the device according to the fitted data. The activation energy and resistance temperature coefficient of materials, and the dark current and cut-off voltage of devices are obtained by analysis.

Figure 4:
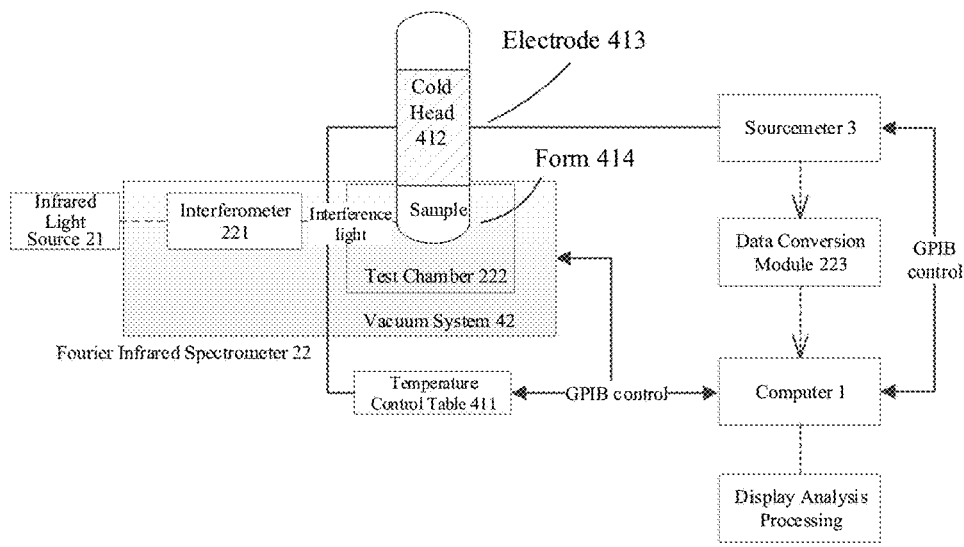
FIG. 4 schematically depicts photocurrent spectrum measurement according to an embodiment of the disclosure.

The photocurrent spectrum testing process is shown in FIG. 4, and the specific testing process is described as follows.

(1) The test sample is placed on the fix bracket 415 of the cold head 412, and the cold head 412 is placed in the test chamber 222 of the Fourier infrared spectrometer 22. The signal end of the measurement module 3 (source meter) is connected to the external electrode 413 of the cold head 412.

(2) The radial form 414 below the cold head 412 is replaced with another one made of different materials according to test requirements, to adapt to the light of different bands, and the form 414 can be adjusted to reach the optimal light path.

The vacuum pump is turned on to vacuumize the test chamber 222 and the cold head 412.

The wavelength scanning range and wavelength scanning step of the Fourier infrared spectrometer 22, the temperature scanning range and step of the temperature control table 411, and the bias current or bias voltage applied by the digital source meter 3 are set in the interface program of the control module 1 (computer). After that, the system will monitor the temperature parameters of the temperature control table 411. After the target temperature point is reached, the digital source meter 3 starts to output voltage, and the infrared spectrometer 22 starts to perform scanning. The system collects the sample photocurrent signal. After the completion of the data collection, the temperature is adjusted to the next temperature point through the temperature control table 411, and the above process is repeated.

The system generates the variable temperature photocurrent spectrum, bias voltage/bias current photocurrent spectrum, and temperature-bias voltage photocurrent spectrum according to the obtained data, and further obtains the peak wavelength of the sample and other parameters, such as full width at half maximum, from the cut-off wavelength of the photocurrent spectrum (50% of the peak wavelength).

Figure 5:
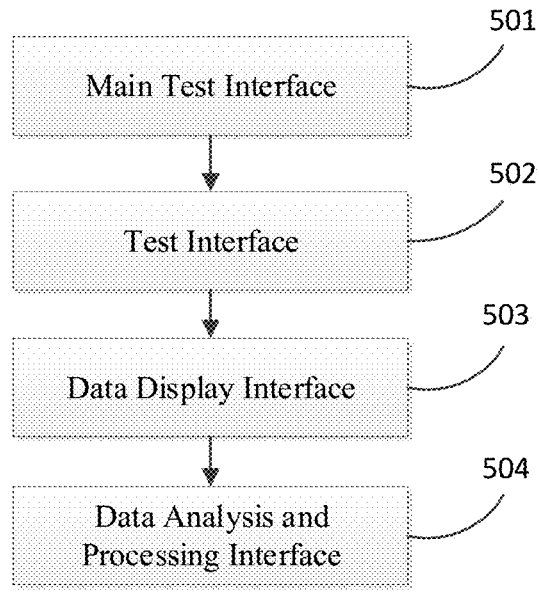
FIG. 5 is a flow chart of operation of a control module according to an embodiment of the disclosure.

FIG. 5 is a flow chart of the test program. The control module 1 includes a main test interface 501, a test interface 502, a data display interface 503, and a data analysis and processing interface 504.

The main test interface 501 controls the connection between the computer and each module, and displays the connection status and the address parameter information of the instrument.

The test interface 502 includes an electrical test unit and a photocurrent spectrum test unit, which are configured for parameter configuration and to send commands to each instrument. Based on the above test process, the main configuration parameters include the temperature range of the temperature control table 411, the output voltage or current of the digital source meter 3, and the scanning wavelength range and resolution of the Fourier infrared spectrometer 22. The test interface 502 displays the current test status information in real time to improve the test stability.

The data display interface 503 is configured to display the collected data in real time, including the temperature parameters transmitted by the temperature control table 411, the current or voltage parameters transmitted by the digital source meter 3, and the photocurrent-wavelength parameters transmitted by the Fourier infrared spectrometer 22.

The data analysis and processing interface 504 includes an electrical analysis unit and a photocurrent spectrum analysis unit. In the electrical analysis, the collected data is subjected to linear fitting or diode volt-ampere characteristic theoretical model fitting according to the test requirements, and the sample resistance temperature coefficient, dark current, cut-off voltage, and other parameters are further analyzed according to the fitting curve. In the photocurrent spectrum analysis, according to the generated variable temperature photocurrent spectrum, bias voltage/bias current photocurrent spectrum, and temperature-bias voltage photocurrent spectrum, other parameters of the sample, such as peak wavelength and full width at half maximum, are further obtained.

Figure 6:
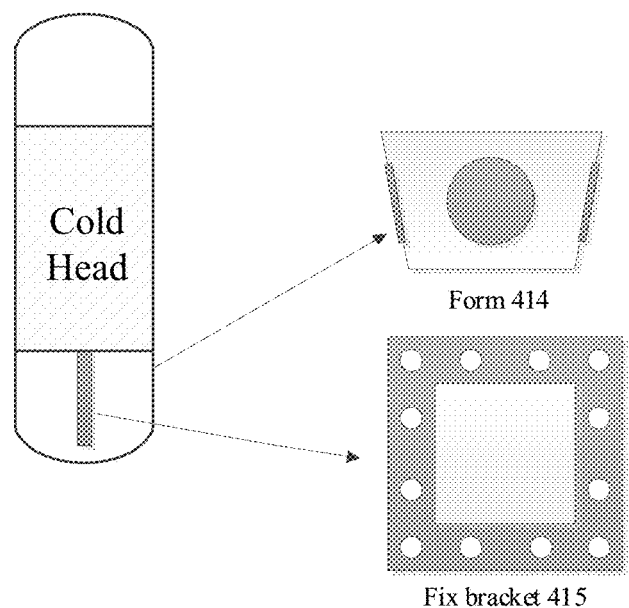
FIG. 6 is a partial structure diagram of a cold head according to an embodiment of the disclosure.

As shown in FIG. 6, the cold head 412 includes the form 414 and the fix bracket 415. The form 414 is composed of four filter windows, and the fix bracket 415 is composed of twelve electrodes welded at the edge. The specific operation steps are as follows.

The sample is welded on the substrate, where a front side of the substrate is configured for the placement of the sample, and a rear side of the substrate is welded with 12 probes at the edges. The substrate material has good light absorption performance and reduces the error caused by substrate reflection.

The form 414 is removed, and the welded sample is placed on the fix bracket 415 to ensure good contact between the probe and the external electrode 413, so as to reduce the error.

The form 414 is selected according to the test requirements, and is installed to ensure that the light directly transmits to the sample through the filter window to reduce the influence of the light path.

The above-mentioned embodiments are merely illustrative of the disclosure, and are not intended to limit the disclosure. It should be understood that any modifications, changes and replacements made by those skilled in the art without departing from the spirit of the disclosure shall fall within the scope of the disclosure defined by the appended claims.

What is claimed is:

1. An automatic photocurrent spectrum measurement system based on a Fourier infrared spectrometer, comprising:
    a light source component;
    an environment control component;
    a measurement module; and
    a control module;
    wherein the light source component comprises an infrared light source and the Fourier infrared spectrometer; the Fourier infrared spectrometer comprises an interferometer, a test chamber and a data conversion module;
    the infrared light source is configured to provide 1-100 μm infrared band light; and the interferometer is configured to convert the infrared band light into interference light;
    the environment control component comprises a temperature control device and a vacuum system; the temperature control device comprises a temperature control table and a cold head; the cold head is provided with an electrode with a wire leading to an outside; the temperature control device is configured to provide a sample test temperature; the vacuum system is configured to provide vacuum conditions for the test chamber and sample environment;
    the measurement module is configured to apply bias voltage and bias current to the electrode; according to measurement requirements, the measurement module is configured to transmit a collected signal to the control module or the Fourier infrared spectrometer; and the data conversion module is configured to perform Fourier transform on a photocurrent interference signal of the collected signal to generate a frequency domain signal, and transmit the frequency domain signal into the control module;
    the control module is configured to send an test instruction to individual components and modules according to measurement requirements; the light source component is configured to control switching of the infrared light source and adjust scanning range and resolution of Fourier infrared spectrometer after receiving the test instruction; the measurement module is configured to change a range of the bias voltage or bias current, and scanning step, collect an electrical signal generated by sample response and transmit the electrical signal to the control module and the light source component after receiving the test instruction; and the environment control component is configured to set the sample test temperature point and a vacuum environment in the test chamber.

2. The automatic photocurrent spectrum measurement system of claim 1, wherein the infrared light source is a near-infrared tungsten filament lamp or iodine tungsten lamp, a mid-infrared silicon carbide rod, or a far-infrared high-pressure mercury lamp.

3. The automatic photocurrent spectrum measurement system of claim 1, wherein a maximum resolution of the Fourier infrared spectrometer is 1 $cm^{-1}$.

4. The automatic photocurrent spectrum measurement system of claim 1, wherein the measurement module is a digital source meter capable of applying a current of 10 nA-7 A.

5. The automatic photocurrent spectrum measurement system of claim 1, wherein the cold head of the temperature control device is provided in the test chamber of the Fourier infrared spectrometer; the cold head and the test chamber are both in a vacuum environment; and a controllable temperature range of the temperature control device is 4K-320K.

6. The automatic photocurrent spectrum measurement system of claim 1, wherein communication of the control module with the light source component, the measurement module and the environment control component is performed through a general-purpose interface bus (GPIB) IEEE 488.2 protocol.

7. The automatic photocurrent spectrum measurement system of claim 1, wherein the cold head is further provided with a form.

8. The automatic photocurrent spectrum measurement system of claim 1, wherein the control module comprises a first test unit, a second test unit, a data display unit, and a data analysis and processing unit;
    the first test unit is configured to control connection of the control module with the measurement module, the light source component and the environment control component, and display connection status, device information and port information;
    the second test unit comprises an electrical test unit and a photocurrent spectrum test unit, and is configured to set parameters and send commands to the measurement module, the light source component and the environment control component;
    the data display unit is configured for real-time display of data acquisition and data transmitted by the data conversion module; and
    the data analysis and processing unit is configured to analyze, process and save collected data.

* * * * *